United States Patent
Feng

(10) Patent No.: US 11,050,915 B2
(45) Date of Patent: Jun. 29, 2021

(54) METHOD FOR ZOOMING BY SWITCHING BETWEEN DUAL CAMERAS, MOBILE TERMINAL, AND STORAGE APPARATUS

(71) Applicant: HUIZHOU TCL MOBILE COMMUNICATION CO., LTD., Huizhou (CN)

(72) Inventor: Jianming Feng, Huizhou (CN)

(73) Assignee: HUIZHOU TCL MOBILE COMMUNICATION CO., LTD., Huizhou (CN)

(*) Notice: Subject to any disclaimer, the term of this patent is extended or adjusted under 35 U.S.C. 154(b) by 18 days.

(21) Appl. No.: 16/711,458

(22) Filed: Dec. 12, 2019

(65) Prior Publication Data
US 2020/0120289 A1    Apr. 16, 2020

Related U.S. Application Data

(63) Continuation of application No. PCT/CN2018/095928, filed on Jul. 17, 2018.

(30) Foreign Application Priority Data

Jul. 17, 2017 (CN) .......................... 201710580057.7

(51) Int. Cl.
*H04N 5/225* (2006.01)
*H04N 5/232* (2006.01)

(52) U.S. Cl.
CPC ....... *H04N 5/2258* (2013.01); *H04N 5/23212* (2013.01); *H04N 5/23232* (2013.01); *H04N 5/23296* (2013.01)

(58) Field of Classification Search
CPC ............. H04N 5/2258; H04N 5/23212; H04N 5/23232; H04N 5/23296
See application file for complete search history.

(56) References Cited

U.S. PATENT DOCUMENTS

2008/0030592 A1* 2/2008 Border ................... H04N 5/232
                                                            348/218.1
2016/0050374 A1* 2/2016 Shabtay ............. H04N 5/23296
                                                            348/240.3
(Continued)

FOREIGN PATENT DOCUMENTS

CN        102801910 A    11/2012
CN        104333700 A    2/2015
(Continued)

OTHER PUBLICATIONS

CN First Office Action for related international Application No. 201710580057.7 dated Jun. 3, 2019;(7 pages).
(Continued)

*Primary Examiner* — Daniel M Pasiewicz

(57) ABSTRACT

A method for zooming by switching between dual cameras includes: detecting, by a mobile terminal, whether the magnification of a first camera during a zooming process exceeds a predefined threshold value, and activating a second camera when the magnification exceeds the predefined threshold value; reading, by the mobile terminal, an average photographing distance difference between the first camera and the second camera pre-stored in a memory, and acquiring a first image of the first camera and a second image of the second camera; and obtaining a common focusing position range of the first camera and the second camera according to the average distance difference, fusing the first image and the second image, and outputting and displaying a fused image. A mobile terminal and a non-transitory storage apparatus performing the above-mentioned method are also provided.

20 Claims, 1 Drawing Sheet

(56) References Cited

U.S. PATENT DOCUMENTS

2016/0080654 A1     3/2016  Chang et al.
2016/0142627 A1*    5/2016  Chou ..................... H04N 5/265
                                                       348/240.2
2017/0085764 A1*    3/2017  Kim ................... H04N 5/23296

FOREIGN PATENT DOCUMENTS

| CN | 105959555 A | 9/2016 |
| CN | 106341593 A | 1/2017 |
| CN | 106791377 A | 5/2017 |
| CN | 107277360 A | 10/2017 |
| CN | 108234851 A | 6/2018 |
| WO | WO2013183406 A1 | 12/2013 |

OTHER PUBLICATIONS

International search report for related International Application No. PCT/CN2018/095928 dated Oct. 12, 2018;(3 pages).
European search report, EP18835798, dated Dec. 5, 2020 (7 pages).

* cited by examiner

METHOD FOR ZOOMING BY SWITCHING BETWEEN DUAL CAMERAS, MOBILE TERMINAL, AND STORAGE APPARATUS

CROSS REFERENCE TO RELATED APPLICATIONS

The present application is a continuation-application of International (PCT) Patent Application No. PCT/CN2018/095928 filed on Jul. 17, 2018, which claims foreign priority of Chinese Patent Application No. 201710580057.7, filed on Jul. 17, 2017, in China National Intellectual Property Administration, the contents of all of which are hereby incorporated by reference.

TECHNICAL FIELD

The present disclosure relates to the field of photographing by mobile terminals, and in particularly to a method of zooming by switching between dual cameras, a mobile terminal, and a non-transitory storage apparatus.

BACKGROUND

As technologies develop rapidly, new technologies, such as near field communication (NFC) and fingerprint recognition, have been continually applied on smart terminals, and application of such technologies provides a convenient life for people and dramatically improves quality of people's lives.

As the smart terminals have been popularized, a mobile terminal (a smart phone, a tablet computer, and the like) has become an essential entertainment tool in people's daily lives.

Dual cameras include a first camera (a typical camera) and a second camera (a periscope camera, also named as an "internal zooming" camera, having a prism to reduce a height compared to the typical camera and suggesting that an optical zooming is performed within a body portion of the camera, and a filter may be easily arranged without a lens barrel, preventing dust from being absorbed into the lens), and the dual cameras may have different focal lengths. Therefore, non-digital zoom may not be required to photograph an object located distantly and zoom in the object. A system of dual cameras may perform the zooming fluently. For example, when taking a video, digital zooming and switching cameras may be combined to achieve a natural effect. The dual cameras use two independent modules, and each module has a sensor. In such a way, image quality may be dramatically improved, noise may be reduced significantly, the entire image may appear to be more clean, and a user may not be able to distinguish the image is captured by one large camera or two small cameras.

The dual cameras work cooperatively, and the system may automatically have an ability to analyze depth of field and can achieve functions of background blurring, automatic focusing, augmented reality, and the like, and an effect of the functions may be quite obvious.

Along with popularization of the dual cameras, the second camera has been used to achieve an imaging effect after magnification. Due to a difference between an angle of the typical camera and an angle of the periscope camera, when zooming in to capture an image with a higher magnification, the first camera is switched into the second camera, a central position of the image may be displaced, and the user may feel an angle difference obviously.

Therefore, techniques in the related art need to be improved.

SUMMARY OF THE DISCLOSURE

According to the present disclosure, to solve the above-mentioned technical problem, a method of zooming by switching between dual cameras, a mobile terminal, and a non-transitory storage apparatus may be provided. In such a way, a smooth switching between the dual cameras may be achieved during zooming to capture an image, and images may be fused to obtain a sharper image after the zooming.

Following technical solutions may be provided.

A method of zooming by switching between dual cameras may be provided and includes following operations.

A mobile terminal may detect whether magnification of a first camera during a zooming process exceeds a threshold. In response to the magnification being detected as exceeding the predefined threshold, a second camera is activated.

The mobile terminal may read an average distance difference between photographing by the first camera and photographing by the second camera, wherein the average distance difference is stored in a non-transitory memory in advance, and obtain a first image of the first camera and a second image of the second camera.

A range of a common focus of the first camera and the second camera may be determined based on the average distance difference, the first image and the second image may be fused and output to be displayed.

The method of zooming by switching between dual cameras may further include following operations.

The average distance difference between photographing by the first camera and photographing by the second camera may be acquired in advance and stored in the non-transitory memory of the mobile terminal.

For the method of zooming by switching between dual cameras, acquiring the average distance difference between photographing by the first camera and photographing by the second camera in advance, and storing the average distance difference in the non-transitory memory of the mobile terminal may include following operations.

A reference card may be placed at a position having a predefined distance away from the dual cameras of the mobile terminal for the dual cameras to capture an image.

The first camera may be activated to capture an image A, and the second camera may be activated to capture an image B.

Five points on the image A and same five points on the image B may be selected, wherein the five points on the image A are $(x1, y1)$, $(x2, y2)$, $(x3, y3)$, $(x4, y4)$, and $(x5, y5)$, the same five points on the image B are $(x1', y1')$, $(x2', y2')$, $(x3', y3')$, $(x4', y4')$, and $(x5', y5')$, and the same five points on the image B are in one-to-one correspondence with the five points on the image A, and a distance difference between each of the five points on the image A and each of the five points of the image B may be calculated correspondingly.

A mean of the distance difference of x-axis values of the five points may be calculated as $\Delta x=[(x1-x1')+(x2-x2')+(x3-x3')+(x4-x4')+(x5-x5')]/5$, and a mean of the distance difference y-axis values of the five points may be calculated as $\Delta y=[(y1-y1')+(y2-y2')+(y3-y3')+(y4-y4')+(y5-y5')]/5$, obtaining the average distance difference $(\Delta x, \Delta y)$.

The average distance difference $(\Delta x, \Delta y)$ may be stored in the non-transitory memory to be invoked by the dual cameras of the mobile terminal for photographing.

For the method of zooming by switching between dual cameras, the predefined distance may be 1 meter.

For the method of zooming by switching between dual cameras, detecting whether magnification of a first camera during the zooming process exceeds a predefined threshold and activating the second camera in response to the magnification being detected as exceeding the predefined threshold includes following operations.

After the mobile terminal activates the first camera to capture the first image, the first camera may continually zoom in.

In response to the magnification being detected by the mobile terminal as exceeding the predefined threshold, the second camera is activated to capture the second image.

For the method of zooming by switching between dual cameras, reading the average distance difference between photographing by the first camera and photographing by the second camera and obtaining the first image of the first camera and the second image of the second camera may include following operations.

The mobile terminal may read the average distance difference stored in the non-transitory memory.

The first image captured by the first camera and the second image captured by the second camera may be acquired.

An edge of the first image and an edge of the second image may be acquired.

A first pixel of the first image and a second pixel of the second image may be acquired, and a pixel difference between the first pixel and the second pixel may be determined.

For the method of zooming by switching between dual cameras, determining a range of a common focus of the first camera and the second camera based on the average distance difference, fusing the first image and the second image, and outputting the fused image to be displayed may include following operations.

The range of the common focus for the first camera and the second camera may be obtained based on the pixel difference.

A final common focal position of the first camera and the second camera may be determined based on the range of the common focus.

The first image may be replaced by the second image based on coordinates of the average distance difference.

The fused image may be output to be displayed.

For the method of zooming by switching between dual cameras, the first image and the second image are processed by performing image detection to obtain the edge of the first image and the edge of the second image.

A mobile terminal may be provided and includes: a processor and a non-transitory memory communicatively connected with the processor. The processor stores a computer program. The computer program may be arranged to be executed to perform the method of zooming by switching between dual cameras. The processor may be arranged to invoke the computer program in the non-transitory memory to perform the method of zooming by switching between dual cameras.

A non-transitory storage apparatus may be provided and stores a computer program. The computer program may be executed to perform the method of zooming by switching between dual cameras.

According to the present disclosure, a method of zooming by switching between dual cameras, a mobile terminal, and a storage apparatus may be provided. The method may include following operations. The mobile terminal may detect whether magnification of the first camera during a zooming process exceeds the predefined threshold and activate the second camera in response to the magnification being detected as exceeding the predefined threshold. The mobile terminal may read the average distance difference between photographing by the first camera and photographing by the second camera, wherein the average distance difference is stored in the non-transitory memory in advance, and obtain the first image of the first camera and the second image of the second camera. The mobile terminal may determine the range of the common focus of the first camera and the second camera based on the average distance difference, fuse the first image and the second image, and output a fused image to be displayed. According to the present disclosure, switching between the dual cameras during a zooming process may be performed fluently, and images may be fused and processed to obtain a sharper image after magnification.

DETAILED DESCRIPTION

Figure 1:
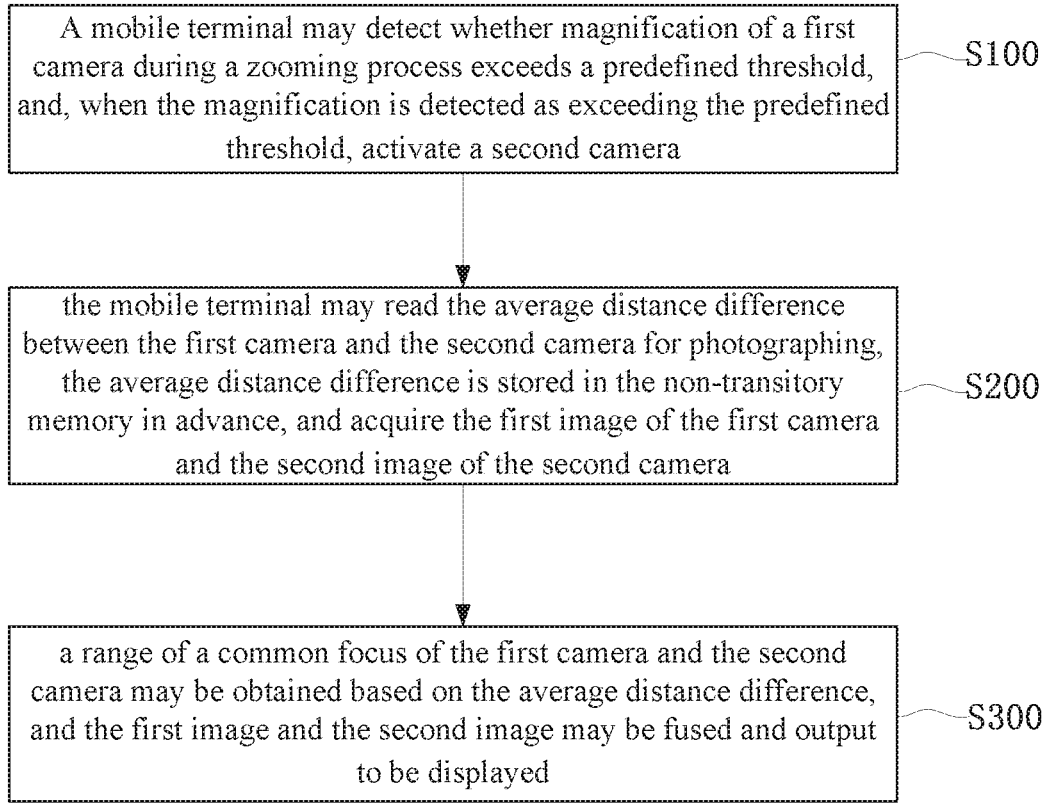
FIG. 1 is a flow chart illustrating a method of zooming by switching between dual cameras according to an embodiment of the present disclosure.

To clarify objectives and technical solution of the present disclosure, the present disclosure may be illustrated in details by referring to the drawings and embodiments. It may be understood that, the embodiments described herein are for the purposes of explaining the present disclosure, but not to limit the present disclosure.

A method of zooming by switching between dual cameras according to an embodiment of the present disclosure is shown in FIG. 1. The method may include following operations.

At block S100, a mobile terminal may detect whether magnification of a first camera during a zooming process exceeds a predefined threshold, and, in response to the magnification being detected as exceeding the predefined threshold, activate a second camera.

To be specific, dual cameras may be arranged on the mobile terminal for photographing. In the related art, when a distance between two cameras is relatively large (a long distance between the two cameras), the two cameras may be focusing to capture an image, and when a distance between the two cameras is relatively small (a short distance between the two cameras), images captured by the two cameras may be fused and processed, and an augmented image may be displayed eventually.

Before the block S100, the method further includes following operations.

At block S10, an average distance difference between photographing by the first camera and photographing by the second camera may be acquired in advance, and the average distance difference may be stored in a non-transitory memory of the mobile terminal.

Preferably, the block S10 may include following operations.

At block S11, a reference card may be placed at a position having a predefined distance away from the dual cameras of the mobile terminal for image capturing. The predefined distance may be 1 meter.

At block S12, the first camera may be activated to capture an image A, and the second camera may be activated to capture an image B.

At block S13, five points on the image A and same five points on the image B may be selected. The five points on the image A may be (x1, y1), (x2, y2), (x3, y3), (x4, y4), and (x5, y5), the same five points on the image B may be (x1', y1'), (x2', y2'), (x3', y3'), (x4', y4'), and (x5', y5'), and the same five points on the image B are in one-to-one correspondence with the five points on the image A. A distance difference between each of the five points on the image A and each of the five points of the image B may be calculated correspondingly.

At block S14, a mean of the distance difference of x-axis values of the five points may be calculated as $\Delta x=[(x1-x1')+(x2-x2')+(x3-x3')+(x4-x4')+(x5-x5')]/5$, a mean of the distance difference of y-axis values of the five points may be calculated as $\Delta y=[(y1-y1')+(y2-y2')+(y3-y3')+(y4-y4')+(y5-y5')]/5$, and the average distance difference ($\Delta x$, $\Delta y$) may be obtained.

At block S15, the average distance difference ($\Delta x$, $\Delta y$) may be stored in the non-transitory memory of the mobile terminal, and the dual cameras may invoke the average distance difference during photographing.

Further, the block S100 may include following operations.

At block S101, after the mobile terminal activates the first camera to capture the first image, the first camera may continually zoom in.

At block S102, when the mobile terminal detects that the magnification during the zooming process exceeds the predefined threshold, the second camera may be activated to capture a second image.

At block S200, the mobile terminal may read the average distance difference between photographing by the first camera and photographing by the second camera, wherein the average distance difference is stored in the non-transitory memory in advance, and acquire the first image of the first camera and the second image of the second camera.

To be specific, when the user is photographing using the mobile terminal, the mobile terminal may acquire the first image of the first camera and the second image of the second camera; the mobile terminal may extract a first pixel of the first image based on features of the first image and extract a second pixel of the second image based on features of the second image; and the mobile terminal may calculate a pixel difference between the first pixel and the second pixel to obtain a pixel difference.

Further, the block S200 may include following operations.

At block S201, the mobile terminal may read the average distance difference stored in the non-transitory memory.

At block S202, the first image of the first camera and the second image of the second camera may be acquired.

At block S203, an edge of the first image and an edge of the second image may be acquired.

At block S204, the first pixel of the first image and the second pixel of the second image may be acquired, and the pixel difference between the first pixel and the second pixel may be acquired.

The first image and the second image may be processed by performing image detection to obtain the edge of the first image and the edge of the second image. In brief, the image detection may refer to detection of an edge of an image, that is, an outline of an area in the image may be extracted. Areas in the image may be defined based on grayscale, and a point of an edge refers to a point having a dramatic gray level jump. Pixel grayscale of points within one area are substantially the same, and a boundary between areas is the edge. The detection of the edge of the image is to define the edge.

At block S300, a range of a common focus of the first camera and the second camera may be obtained based on the average distance difference, and the first image and the second image may be fused and output to be displayed.

To be specific, the mobile terminal may determine a range of an image distance between the first image and the second image based on the pixel difference between the first pixel and the second pixel. A range of a subject distance of the first image and a range of a subject distance of the second image may be obtained from the image distance by performing a transformation rule between the image distance and the subject distance. The range of the common focus for the first camera and the second camera may be obtained based on the subject distance. The range of the common focus may indicate a range of substantial focusing of the two cameras, but not a final position of a common focus (a focal point for the two cameras). Based on an algorithm of image resolution and the range of the common focus, the final position of the common focus of the first camera and the second camera may be determined. The mobile terminal may determine the final position of the common focus of the first camera and the second camera (the focal point for the two cameras) based on the algorithm of image resolution.

The mobile terminal may determine a resolution value of each image corresponding to each position point within the range of the common focus based on the algorithm of image resolution. The position point of which the image having a highest resolution value may be determined to be the final common focus position for the first camera and the second camera (the focal position for the two cameras). That is, the mobile terminal may search within the range of the substantial common focus (by comparing image resolution values) to determine a focal position corresponding to the image having the highest resolution value, therefore, the two cameras may focus.

Further, the block S300 includes following operations.

At block S301, the range of the common focus for the first camera and the second camera may be obtained based on the pixel difference.

At block S302, the final common focal position of the first camera and the second camera may be determined based on the range of the common focus.

At block S303, the first image may be replaced by the second image based on coordinates of the average distance difference.

At block S304, images may be fused and output to be displayed.

Figure 2:
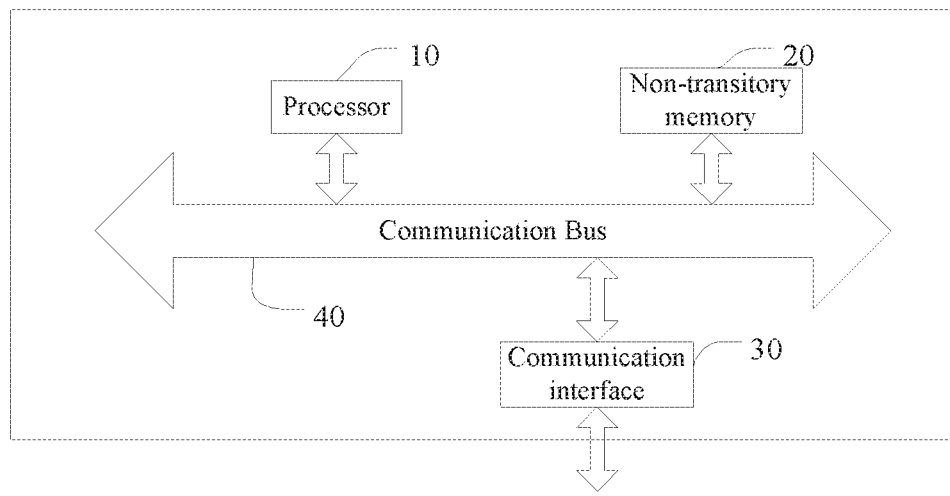
FIG. 2 is a diagram illustrating functions and principles of a mobile terminal according to an embodiment of the present disclosure.

According to the present disclosure, a mobile terminal may be provided as shown in FIG. 2. The mobile terminal includes: a processor 10, a non-transitory memory 20, a communication interface 30, and a bus 40.

The processor 10, the non-transitory memory 20, the communication interface 30 may be communicated via the bus 40.

The communication interface 30 may be arranged to facilitate information transmission between communication devices of the mobile terminal.

The processor 10 may be arranged to invoke a computer program stored in the non-transitory memory 20 to perform the method as described in the above-mentioned embodiments. For example, the method may include following operations. The mobile terminal may detect whether the magnification of the first camera during a zooming process exceeds the predefined threshold. In response to the magnification of the first camera during the zooming process being detected as exceeding the predefined threshold, the second camera may be activated. The mobile terminal may read the average distance difference between photographing by the first camera and the second camera, the average distance difference is stored in the non-transitory memory in advance, and the first image of the first camera and the second image of the second camera may be obtained. The range of the common focus of the first camera and the second camera based on the average distance difference, and the first image and the second image may be fused and output to be displayed.

The present disclosure further provides a non-transitory storage apparatus, having a computer program stored therein. The computer program may be executed to perform the method of zooming by switching between dual cameras.

To summarized, the present disclosure provides a method of zooming by switching between dual cameras, a mobile terminal, and a storage apparatus. The method includes following operations. The mobile terminal may detect whether the magnification of the first camera during a zooming process exceeds the predefined threshold. In response to the magnification of the first camera during the zooming process being detected as exceeding the predefined threshold, the second camera may be activated. The mobile terminal may read the average distance difference between photographing by the first camera and the second camera, the average distance difference is stored in the non-transitory memory in advance, and the first image of the first camera and the second image of the second camera may be obtained. The range of the common focus of the first camera and the second camera may be determined based on the average distance difference, and the first image and the second image may be fused and output to be displayed. According to the present disclosure, the dual cameras may be fluently switched during the zooming process, and images may be fused and processed to obtain a sharper image after magnification.

Apparently, any one of skill in the related art shall understand that some or all of the operations of the method as described in the above embodiments may be performed by a computer program instructing related hardware (such as a processor, a control, or the like). The computer program may be stored in a non-transitory medium of a computer and executed to perform the operations described in the above embodiments. The non-transitory medium may be a non-transitory memory, a magnetic disc, an optical disc, or the like.

It may be understood that, application of the present disclosure is not limited by the above embodiments. To any one of skill in the related art, embodiments may be improved and transformed based on the above illustration, the improvement and the transformation shall be within the scope of the present disclosure.

What is claimed is:

1. A method of zooming by switching between dual cameras, comprising:
   detecting, by a mobile terminal, whether magnification of a first camera during a zooming process exceeds a predefined threshold, and, in response to the magnification being detected as exceeding the predefined threshold, activating a second camera;
   reading, by the mobile terminal, an average distance difference between photographing by the first camera and photographing by the second camera, and obtaining a first image of the first camera and a second image of the second camera, wherein the average distance difference is stored in a non-transitory memory in advance; and
   determining a range of a common focus of the first camera and the second camera based on the average distance difference, fusing the first image and the second image, and outputting a fused image to be displayed.

2. The method according to claim 1, further comprising:
   acquiring the average distance difference between photographing by the first camera and photographing by the second camera in advance, and storing the average distance difference in the non-transitory memory of the mobile terminal.

3. The method according to claim 2, wherein the acquiring the average distance difference between photographing by the first camera and photographing by the second camera in advance, and storing the average distance difference in the non-transitory memory of the mobile terminal comprises:
   placing a reference card at a position having a predefined distance away from the dual cameras of the mobile terminal for the dual cameras to capture an image;
   activating the first camera to capture an image A, activating the second camera to capture an image B;
   selecting five points on the image A and same five points on the image B, wherein the five points on the image A are (x1, y1), (x2, y2), (x3, y3), (x4, y4), and (x5, y5), the same five points on the image B are (x1', y1'), (x2', y2'), (x3', y3'), (x4', y4'), and (x5', y5'), and the same five points on the image B are in one-to-one correspondence with the five points on the image A, calculating a distance difference between each of the five points on the image A and each of the five points of the image B correspondingly;
   calculating a mean of the distance difference of x-axis values of the five points as $\Delta x=[(x1-x1')+(x2-x2')+(x3-x3')+(x4-x4')+(x5-x5')]/5$, and calculating a mean of the distance difference y-axis values of the five points as $\Delta y=[(y1-y1')+(y2-y2')+(y3-y3')+(y4-y4')+(y5-y5')]/5$, obtaining the average distance difference $(\Delta x, \Delta y)$; and
   storing the average distance difference $(\Delta x, \Delta y)$ in the non-transitory memory to be invoked by the dual cameras of the mobile terminal for photographing.

4. The method according to claim 3, wherein the predefined distance is 1 meter.

5. The method according to claim 1, wherein the detecting, by a mobile terminal, whether magnification of a first camera during a zooming process exceeds a predefined threshold, and, in response to the magnification being detected as exceeding the predefined threshold, activating a second camera comprises:
   after activating the first camera to capture the first image, the first camera continually zooming in; and
   in response to the magnification being detected by the mobile terminal as exceeding the predefined threshold, activating the second camera to capture the second image.

6. The method according to claim 5, wherein the reading, by the mobile terminal, an average distance difference between photographing by the first camera and photographing by the second camera, and obtaining a first image of the first camera and a second image of the second camera comprises:
   reading, by the mobile terminal, the average distance difference stored in the non-transitory memory;
   obtaining the first image of the first camera and the second image of the second camera;

acquiring an edge of the first image and an edge of the second image; and acquiring a first pixel of the first image and a second pixel of the second image, and determining a pixel difference between the first pixel and the second pixel.

7. The method according to claim 6, wherein the determining a range of a common focus of the first camera and the second camera based on the average distance difference, fusing the first image and the second image, and outputting a fused image to be displayed comprises:

obtaining the range of the common focus of the first camera and the second camera based on the pixel difference;

determining a final common focal position of the first camera and the second camera based on the range of the common focus;

replacing the first image with the second image based on coordinates of the average distance difference; and outputting the fused image to be displayed.

8. The method according to claim 6, wherein the first image and the second image are processed by performing image detection to obtain the edge of the first image and the edge of the second image.

9. A mobile terminal, comprising: a processor and a non-transitory memory communicatively connected with the processor, wherein the non-transitory memory is arranged to store a computer program, the computer program is arranged to be executed to perform a method of zooming by switching between dual cameras; and the processor is arranged to invoke the computer program stored in the non-transitory memory to perform the method of zooming by switching between dual cameras by performing operations of:

detecting, by the mobile terminal, whether magnification of a first camera during a zooming process exceeds a predefined threshold, and, in response to the magnification being detected as exceeding the predefined threshold, activating a second camera;

reading, by the mobile terminal, an average distance difference between photographing by the first camera and photographing by the second camera, and obtaining a first image of the first camera and a second image of the second camera, wherein the average distance difference is stored in a non-transitory memory in advance; and determining a range of a common focus of the first camera and the second camera based on the average distance difference, fusing the first image and the second image, and outputting a fused image to be displayed.

10. The mobile terminal according to claim 9, wherein the processor is further arranged to invoke the computer program stored in the non-transitory memory to perform operations of:

acquiring the average distance difference between photographing by the first camera and photographing by the second camera in advance, and storing the average distance difference in the non-transitory memory of the mobile terminal.

11. The mobile terminal according to claim 10, wherein, when acquiring the average distance difference between photographing by the first camera and photographing by the second camera in advance, and storing the average distance difference in the non-transitory memory of the mobile terminal, the processor is further arranged to invoke the computer program stored in the non-transitory memory to perform operations of:

placing a reference card at a position having a predefined distance away from the dual cameras of the mobile terminal for the dual cameras to capture an image;

activating the first camera to capture an image A, activating the second camera to obtain an image B;

selecting five points on the image A and same five points on the image B, wherein the five points on the image A are (x1, y1), (x2, y2), (x3, y3), (x4, y4), and (x5, y5), the same five points on the image B are (x1', y1'), (x2', y2'), (x3', y3'), (x4', y4'), and (x5', y5'), and the same five points on the image B are in one-to-one correspondence with the five points on the image A, calculating a distance difference between each of the five points on the image A and each of the five points of the image B correspondingly;

calculating a mean of the distance difference of x-axis values of the five points as $\Delta x=[(x1-x1')+(x2-x2')+(x3-x3')+(x4-x4')+(x5-x5')]/5$, and calculating a mean of the distance difference y-axis values of the five points as $\Delta y=[(y1-y1')+(y2-y2')+(y3-y3')+(y4-y4')+(y5-y5')]/5$, obtaining the average distance difference ($\Delta x$, $\Delta y$); and storing the average distance difference ($\Delta x$, $\Delta y$) in the non-transitory memory to be invoked by the dual cameras of the mobile terminal for photographing.

12. The mobile terminal according to claim 9, wherein, when detecting, by the mobile terminal, whether magnification of a first camera during a zooming process exceeds a predefined threshold, and, in response to the magnification being detected as exceeding the predefined threshold, activating a second camera, the processor is further arranged to invoke the computer program stored in the non-transitory memory to perform operations of:

after activating the first camera to capture the first image, the first camera continually zooming in; and in response to the magnification being detected by the mobile terminal as exceeding the predefined threshold, activating the second camera to capture the second image.

13. The mobile terminal according to claim 12, wherein, when reading, by the mobile terminal, an average distance difference between photographing by the first camera and photographing by the second camera, and obtaining a first image of the first camera and a second image of the second camera, the processor is further arranged to invoke the computer program stored in the non-transitory memory to perform operations of:

reading, by the mobile terminal, the average distance difference stored in the non-transitory memory;

obtaining the first image of the first camera and the second image of the second camera;

acquiring an edge of the first image and an edge of the second image; and acquiring a first pixel of the first image and a second pixel of the second image, and determining a pixel difference between the first pixel and the second pixel.

14. The mobile terminal according to claim 13, wherein, when determining a range of a common focus of the first camera and the second camera based on the average distance difference, fusing the first image and the second image, and outputting a fused image to be displayed, the processor is further arranged to invoke the computer program stored in the non-transitory memory to perform operations of:

obtaining the range of the common focus of the first camera and the second camera based on the pixel difference;
determining a final common focal position of the first camera and the second camera based on the range of the common focus;
replacing the first image with the second image based on coordinates of the average distance difference; and
outputting the fused image to be displayed.

15. A non-transitory storage apparatus, having a computer program stored in, wherein the computer program is arranged to be executed to perform a method of zooming by switching between dual cameras, comprising operations of:
detecting, by the mobile terminal, whether magnification of a first camera during a zooming process exceeds a predefined threshold, and, in response to the magnification being detected as exceeding the predefined threshold, activating a second camera;
reading, by the mobile terminal, an average distance difference between photographing by the first camera and photographing by the second camera, and obtaining a first image of the first camera and a second image of the second camera, wherein the average distance difference is stored in a non-transitory memory in advance; and
determining a range of a common focus of the first camera and the second camera based on the average distance difference, fusing the first image and the second image, and outputting a fused image to be displayed.

16. The non-transitory storage apparatus according to claim 15, wherein the computer program is further arranged to be executed to perform operations of:
acquiring the average distance difference between photographing by the first camera and photographing by the second camera in advance, and storing the average distance difference in the non-transitory memory of the mobile terminal.

17. The non-transitory storage apparatus according to claim 16, wherein, when acquiring the average distance difference between photographing by the first camera and photographing by the second camera in advance, and storing the average distance difference in the non-transitory memory of the mobile terminal, the computer program is further arranged to be executed to perform operations of:
placing a reference card at a position having a predefined distance away from the dual cameras of the mobile terminal for the dual cameras to capture an image;
activating the first camera to capture an image A, activating the second camera to obtain an image B;
selecting five points on the image A and same five points on the image B, wherein the five points on the image A are (x1, y1), (x2, y2), (x3, y3), (x4, y4), and (x5, y5), the same five points on the image B are (x1', y1'), (x2', y2'), (x3', y3'), (x4', y4'), and (x5', y5'), and the same five points on the image B are in one-to-one correspondence with the five points on the image A, calculating a distance difference between each of the five points on the image A and each of the five points of the image B correspondingly;
calculating a mean of the distance difference of x-axis values of the five points as $\Delta x=[(x1-x1')+(x2-x2')+(x3-x3')+(x4-x4')+(x5-x5')]/5$, and calculating a mean of the distance difference y-axis values of the five points as $\Delta y=[(y1-y1')+(y2-y2')+(y3-y3')+(y4-y4')+(y5-y5')]/5$, obtaining the average distance difference $(\Delta x, \Delta y)$; and
storing the average distance difference $(\Delta x, \Delta y)$ in the non-transitory memory to be invoked by the dual cameras of the mobile terminal for photographing.

18. The non-transitory storage apparatus according to claim 15, wherein, when detecting, by the mobile terminal, whether magnification of a first camera during a zooming process exceeds a predefined threshold, and, in response to the magnification being detected as exceeding the predefined threshold, activating a second camera, the computer program is further arranged to be executed to perform operations of:
after activating the first camera to capture the first image, the first camera continually zooming in; and
in response to the magnification being detected by the mobile terminal as exceeding the predefined threshold, activating the second camera to capture the second image.

19. The non-transitory storage apparatus according to claim 18, wherein, when reading, by the mobile terminal, an average distance difference between photographing by the first camera and photographing by the second camera, and obtaining a first image of the first camera and a second image of the second camera, the computer program is further arranged to be executed to perform operations of:
reading, by the mobile terminal, the average distance difference stored in the non-transitory memory;
obtaining the first image of the first camera and the second image of the second camera;
acquiring an edge of the first image and an edge of the second image; and
acquiring a first pixel of the first image and a second pixel of the second image, and determining a pixel difference between the first pixel and the second pixel.

20. The non-transitory storage apparatus according to claim 19, wherein, when determining a range of a common focus of the first camera and the second camera based on the average distance difference, fusing the first image and the second image, and outputting a fused image to be displayed, the computer program is further arranged to be executed to perform operations of:
obtaining the range of the common focus of the first camera and the second camera based on the pixel difference;
determining a final common focal position of the first camera and the second camera based on the range of the common focus;
replacing the first image with the second image based on coordinates of the average distance difference; and
outputting the fused image to be displayed.

* * * * *